US009796399B2

(12) United States Patent
Hourtane et al.

(10) Patent No.: US 9,796,399 B2
(45) Date of Patent: Oct. 24, 2017

(54) METHOD FOR CONTROLLING A LAND TRANSPORT VEHICLE, LAND TRANSPORT VEHICLE, GROUND EQUIPMENT AND TRANSPORT SYSTEM

(71) Applicant: ALSTOM TRANSPORT TECHNOLOGIES, Levallois Perret (FR)

(72) Inventors: Jean-Luc Hourtane, Bouc Bel Air (FR); Denis Gauche, Le Bar sur Loup (FR); David Chevallier, Les Milles (FR); Yann Chaintron, Vitrolles (FR); Xavier Rabeyrin, Marseilles (FR)

(73) Assignee: ALSTOM TRANSPORT TECHNOLOGIES, Lavallois Perret (FR)

( * ) Notice: Subject to any disclaimer, the term of this patent is extended or adjusted under 35 U.S.C. 154(b) by 1 day.

(21) Appl. No.: 14/840,794

(22) Filed: Aug. 31, 2015

(65) Prior Publication Data
US 2016/0068172 A1   Mar. 10, 2016

(30) Foreign Application Priority Data
Sep. 4, 2014   (FR) ..................... 14 58296

(51) Int. Cl.
*B61L 3/18*   (2006.01)
*G06F 1/26*   (2006.01)
(Continued)

(52) U.S. Cl.
CPC ............... *B61L 3/18* (2013.01); *B60M 1/36* (2013.01); *B61L 3/006* (2013.01); *B61L 3/008* (2013.01);
(Continued)

(58) Field of Classification Search
CPC .. B61L 3/18; B61L 3/008; B61L 3/006; B61L 23/14; B61L 27/0094; G06F 1/266; G05B 15/02; B60M 1/36
See application file for complete search history.

(56) References Cited

U.S. PATENT DOCUMENTS 3,740,549 A * 6/1973 Thorne-Booth ........ B61L 3/225
246/122 R
4,787,581 A * 11/1988 Dobler ..................... B61L 1/20
246/122 R
(Continued)

FOREIGN PATENT DOCUMENTS

FR   2 791 929 A1   10/2000
FR   2 918 004 A1   1/2009
(Continued)

OTHER PUBLICATIONS

Machine translation of FR 2918004, Jan. 2, 2009.*
FR Search Report, dated May 11, 2015, from corresponding FR application.

*Primary Examiner* — Frederick Brushaber
(74) *Attorney, Agent, or Firm* — Young & Thompson

(57) ABSTRACT

A method for controlling a land transport vehicle traveling on a track, the track including, in a movement direction of the land transport vehicle, a zone with an external power supply adjacent to a zone without an external power supply to be traveled with an onboard power supply device, the zone with an external power supply including an external power supply device on the ground provided with a plurality of power supply segments arranged sequentially in the direction of the track, the land transport vehicle including at least one capture device adapted to be placed in contact with a power supply segment on the one hand and to be electrically connected to at least one traction motor on the other hand, the land transport vehicle further including an onboard (Continued)

power supply device adapted to be electrically connected to the or each traction motor.

4 Claims, 5 Drawing Sheets

(51) Int. Cl.
    *B61L 3/00*         (2006.01)
    *G05B 15/02*      (2006.01)
    *B61L 23/14*      (2006.01)
    *B61L 27/00*      (2006.01)
    *B60M 1/36*       (2006.01)

(52) U.S. Cl.
    CPC ........... *B61L 23/14* (2013.01); *B61L 27/0094* (2013.01); *G05B 15/02* (2013.01); *G06F 1/266* (2013.01)

(56) References Cited

U.S. PATENT DOCUMENTS

| | | | | |
|---|---|---|---|---|
| 4,840,125 A * | 6/1989 | Lueers | ..................... | B60L 13/03 104/292 |
| 5,470,034 A * | 11/1995 | Reeves | ................. | B61L 23/166 246/122 R |
| 5,969,643 A * | 10/1999 | Curtis | ..................... | B61L 3/004 340/933 |
| 6,271,754 B1 * | 8/2001 | Durtler | ................. | B61L 23/041 340/545.3 |
| 6,402,094 B1 * | 6/2002 | Beer | ....................... | B61L 3/225 246/122 R |
| 6,490,523 B2 * | 12/2002 | Doner | ................. | B61L 15/0027 246/1 R |
| 8,380,361 B2 * | 2/2013 | Evans | ..................... | B61L 17/00 246/14 |
| 2006/0005737 A1 * | 1/2006 | Kumar | ..................... | B60K 6/46 105/35 |
| 2007/0001058 A1 * | 1/2007 | Severson | ................ | A63H 19/32 246/1 R |
| 2008/0159281 A1 * | 7/2008 | Jesseph | .................... | H04B 3/54 370/389 |
| 2009/0173842 A1 * | 7/2009 | Lawson | .................. | B61L 1/181 246/34 R |
| 2012/0090499 A1 * | 4/2012 | Shimada | .................... | B61C 3/02 105/49 |
| 2012/0232813 A1 * | 9/2012 | Lawson | .................... | B61L 1/20 702/58 |
| 2014/0379181 A1 * | 12/2014 | Fujimoto | ................ | B61L 3/125 701/19 |
| 2016/0114701 A1 * | 4/2016 | Heinen | .................... | B60M 3/06 191/2 |
| 2016/0176420 A1 * | 6/2016 | Aisa | ........................ | B61L 1/187 246/219 |
| 2016/0325766 A1 * | 11/2016 | Tsujita | .................... | B61L 3/125 |

FOREIGN PATENT DOCUMENTS

| | | |
|---|---|---|
| FR | 2 924 990 A1 | 6/2009 |
| JP | 2004 136860 A | 5/2004 |

* cited by examiner

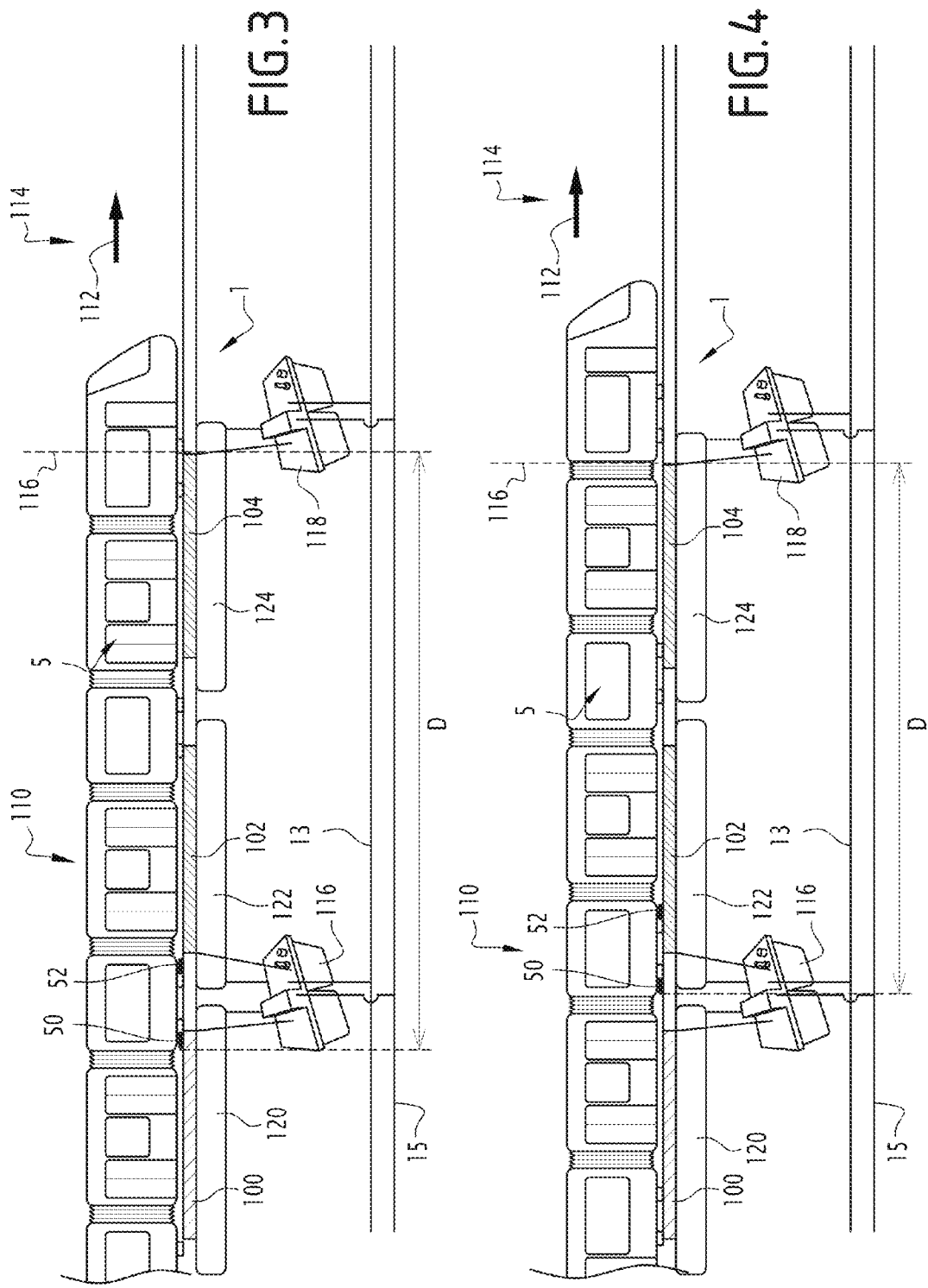

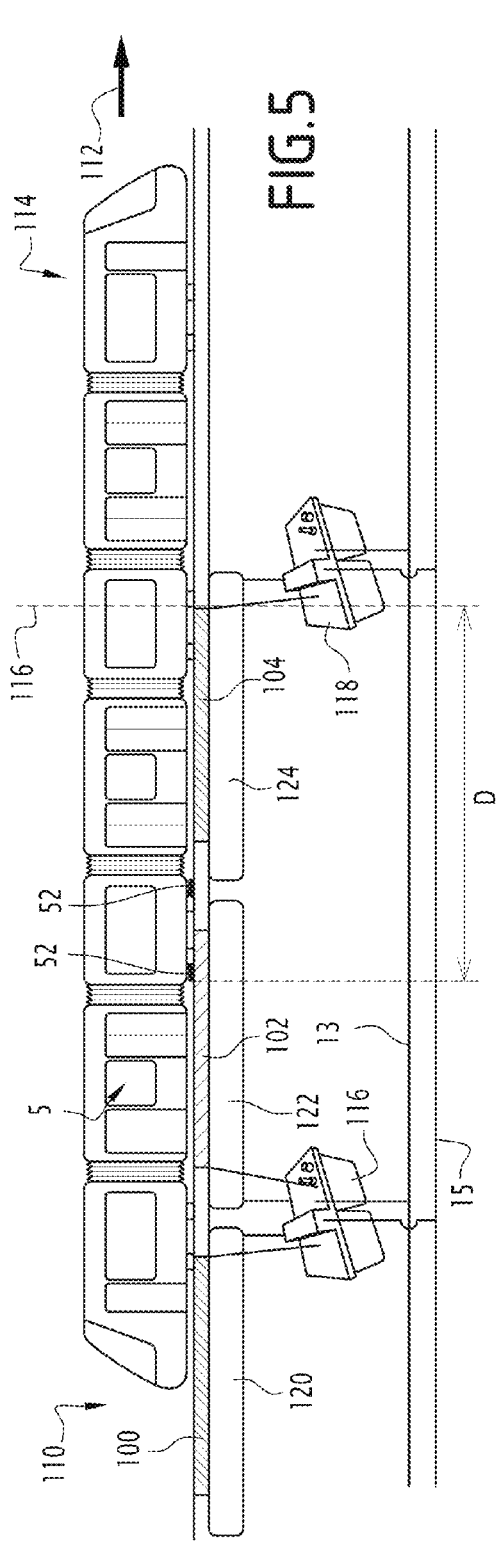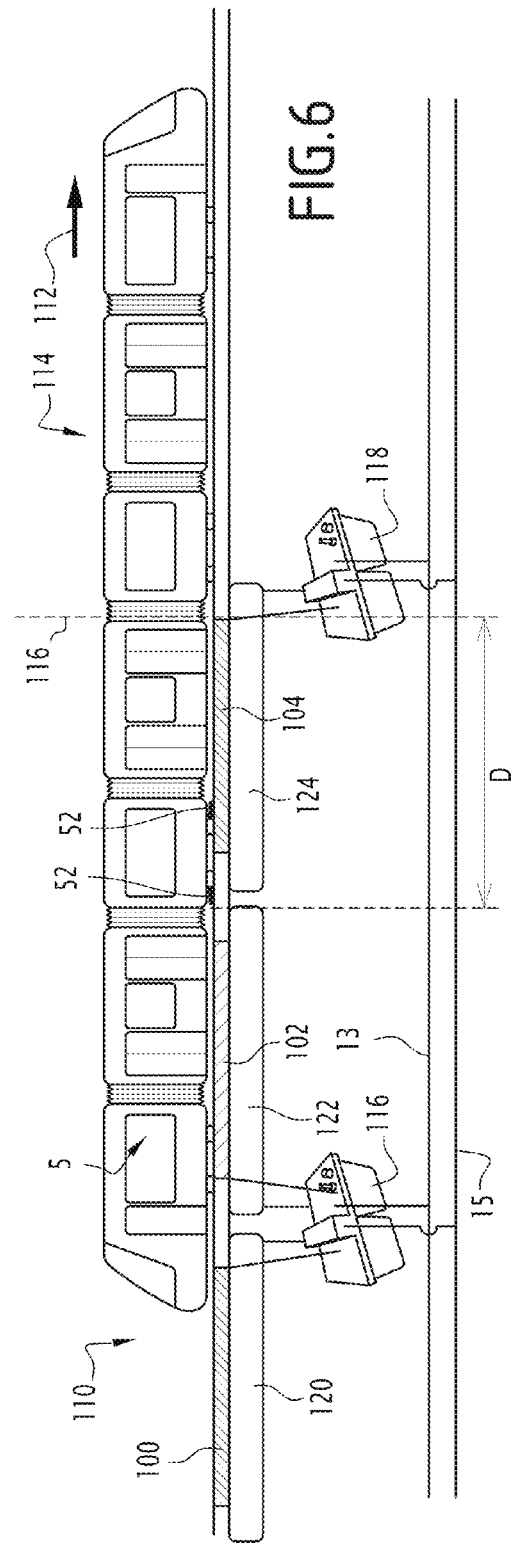

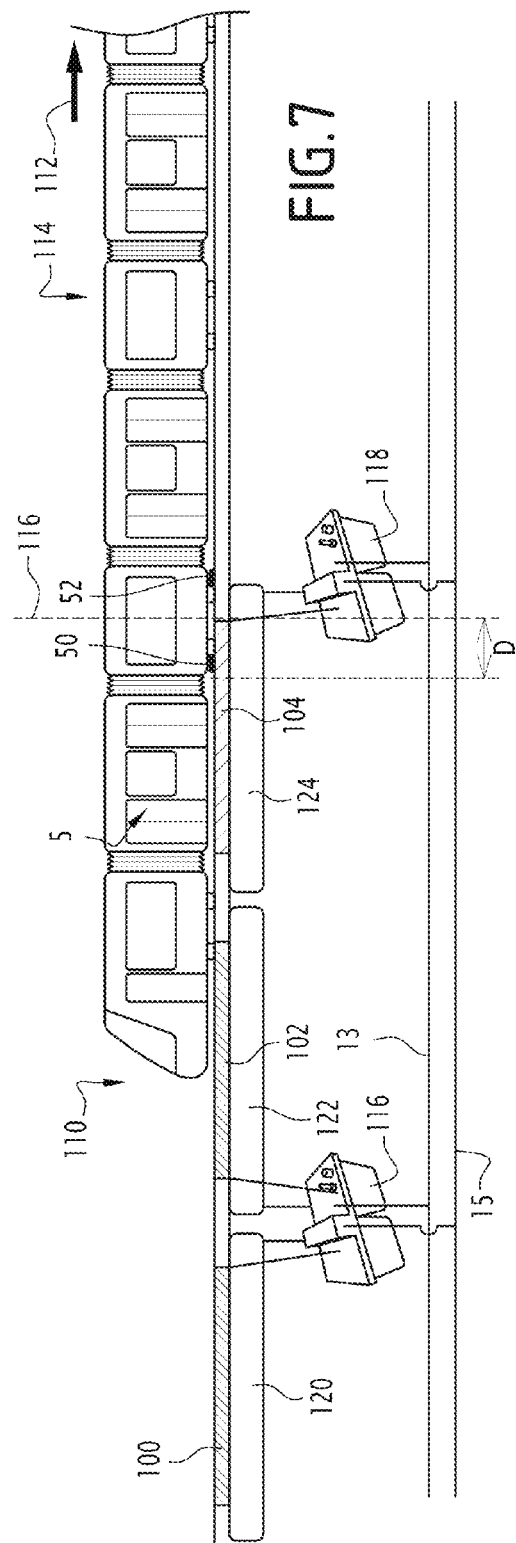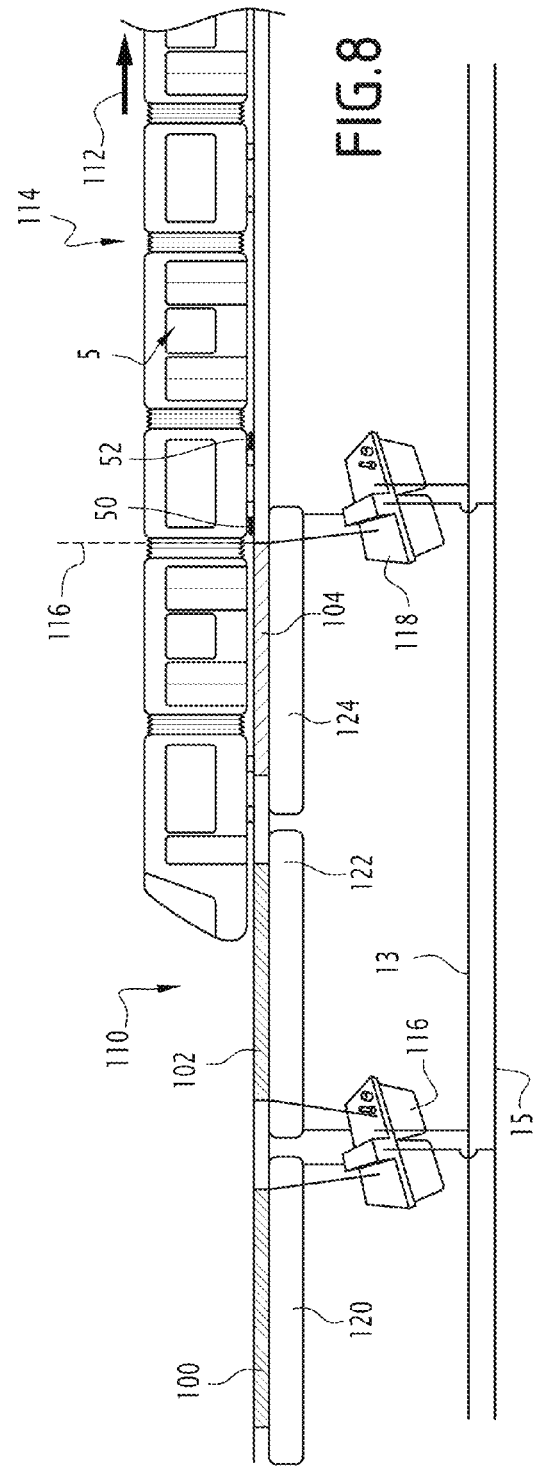

METHOD FOR CONTROLLING A LAND TRANSPORT VEHICLE, LAND TRANSPORT VEHICLE, GROUND EQUIPMENT AND TRANSPORT SYSTEM

FIELD OF THE INVENTION

The present invention relates to a method for controlling a land transport vehicle traveling on a track, the track including, in a movement direction of the land transport vehicle, a zone with an external power supply adjacent to a zone with no external power supply to be traveled by an onboard power device, the zone with an external power supply including an external power supply device via the ground provided with a plurality of supply segments arranged sequentially in the direction of the track, the land transport vehicle including at least one capture device adapted to be placed in contact with a supply segment on the one hand and to be electrically connected to at least one traction motor on the other hand, the land transport vehicle further including an onboard power supply device adapted to be electrically connected to the or each traction motor.

Furthermore, the present invention relates to a land transport vehicle including at least one traction motor; at least one capture device, adapted to be placed in contact with a power supply segment of an external power supply device and adapted to be connected to the or each traction motor; a communication unit adapted to communicate with a piece of ground equipment associated with the power supply segment in vicinity of which the land transport vehicle is traveling at the current moment; an onboard controller connected to the communication unit to send and receive signals. Furthermore, the invention relates to ground equipment for a transport system and a transport system including at least one land transport vehicle as described above and ground equipment as described above.

BACKGROUND OF THE INVENTION

Document FR 2,791,929 proposed a presence detection device for a railway vehicle. The railway vehicle comprises at least one collector shoe that is placed in contact with a power supply segment arranged on the ground. Each segment comprises an antenna adapted to receive a presence signal sent by the railway vehicle. Each segment is adapted to send a return signal in response. When the railway vehicle does not receive a return signal, a switch placed between the collector shoe and the motor of the vehicle interrupts the electrical contact between the collector shoe and the motor immediately. This creates an abrupt deceleration of the railway vehicle.

SUMMARY OF THE INVENTION

The aim of the present invention is to allow the land transport vehicle supplied with electricity from the ground to anticipate the capture type of the traction current and thus to increase the comfort of passengers onboard such a land transport vehicle, by reducing sudden changes in speed of the land transport vehicle.

This aim is achieved according to the invention owing to a method for controlling a land transport vehicle traveling on a track, the track including, in a movement direction of the land transport vehicle, a zone with an external power supply adjacent to a zone without an external power supply to be traveled with an onboard power supply device, the zone with an external power supply including an external power supply device on the ground provided with a plurality of power supply segments arranged sequentially in the direction of the track, the land transport vehicle including at least one capture device adapted to be placed in contact with a power supply segment on the one hand and to be electrically connected to at least one traction motor on the other hand, the land transport vehicle further including an onboard power supply device adapted to be electrically connected to the or each traction motor, the method including at least the following steps:

a) powering the or each traction motor with a power supplied by a power supply segment, with which the capture device is in contact;

b) emitting, via an antenna associated with the power supply segment situated close to the end of the zone with an external power supply, a signal indicating the end of the zone with an external power supply;

c) receiving, via the land transport vehicle positioned in vicinity to the power supply segment associated with the antenna sending said signal indicating the end of a zone with an external power supply, the signal indicating the end of a zone with an external power supply;

d) commanding, after receiving the signal indicating the end of a zone with an external power supply, a transition from a power demand from the external power supply device to a power demand from the onboard power supply device to power the or each traction motor.

According to advantageous features, the method may include one or more of the following features:

before step b), the steps consisting of: sending, by the land transport vehicle, a presence signal of the land transport vehicle to the antenna associated with the power supply segment, the signal indicating the end of a zone with an external power supply being sent by the same antenna in response to the presence signal of the land transport vehicle;

in response to the presence signal of the land transport vehicle, the power supply segment with which the antenna is associated is powered on;

the transition command includes a comparison of the current speed with a predetermined speed; a decrease in the power requested from the external power supply device; an increase in the power requested from the onboard power supply device; an adjustment of the power requested from the external power supply device to a maximum power generated by the onboard power supply device; and/or a switch to the onboard power supply device.

Furthermore, the present invention also proposes a land transport vehicle including:

at least one traction motor;

at least one capture device, adapted to be placed in contact with a power supply segment of an external power supply device and adapted to be connected to the or each traction motor;

a communication unit adapted to communicate with ground equipment associated with the power supply segment in vicinity of which the land transport vehicle is traveling at the current moment;

an onboard controller connected to the communication unit to send and receive signals; wherein the land transport vehicle further includes an onboard power supply device adapted to be connected to the or each traction motor, the onboard controller being adapted to regulate the power supplied to the or each traction motor by the or each capture device and/or by the onboard power supply device, and in that the onboard controller is adapted to:

a) receive a signal indicating the end of a zone with an external power supply;

b) command, after receiving the signal indicating the end of a zone with an external power supply, a transition from a power demand from the external power supply device toward a power demand from the onboard power supply device to power the or each traction motor.

According to advantageous features, the land transport vehicle includes one or more of the following features:

the onboard power supply device includes at least one chemical battery, at least one fuel cell, and/or at least one supercapacitor;

the communication unit includes an onboard antenna arranged in one or each capture device;

the onboard controller is adapted to send a presence signal of the land transport vehicle and receive, in response to the presence signal of the land transport vehicle, a signal indicating the end of a zone with an external power supply.

The present invention also relates to ground equipment for a transport system, the equipment including:

a track for a land transport vehicle;

an external power supply device including a plurality of power supply segments arranged sequentially along the track, the plurality of power supply segments forming an external power supply zone, at least one end segment being situated in vicinity to one end of the external power supply zone adjacent to a zone with no external power supply, to be traveled with an onboard power supply device, a communication antenna being associated with the or each external power supply segments; and a controller adapted to power on the end segment and adapted to send, using an antenna associated with that end segment, a signal indicating the end of a zone with an external power supply in response to a presence signal of the land transport vehicle received by said antenna.

Lastly, the present invention proposes a land transport system, guided on rails or on tires, including at least one vehicle as described above and one piece of ground equipment as described above.

Guided land transport on rails refers to any transport of the railway type, urban type (e.g., tram), suburban type (e.g., metro), commuter type, regional type, or high-speed or very high-speed type.

Land transport guided on tires refers to any land transport using tires, for example rubber-tyred subway, rubber-tyred tram, or any other type of land transport associated with electric roads such as electric buses, electric trucks, or electric cars.

The present invention generally relates to a method for managing the power supply of electric land transport vehicle supplied with electricity from the ground traveling on a track, the track including, in a movement direction of the land transport vehicle, a zone with an external power supply, equipped with an external ground power supply device, adjacent to a zone with no external power supply, to be traveled with an onboard power supply device onboard the vehicle, the method consisting of informing the vehicle that it is approaching the end of the zone with an external power supply, the vehicle commanding, based on that information, a suitable transition from the request for electricity from the external power supply device toward the onboard power supply device.

BRIEF DESCRIPTION OF THE DRAWINGS

Other features, aims and advantages of the invention will appear upon reading the following detailed description, done in reference to the appended figures, in which:

FIGS. 2 to 8 diagrammatically show different steps in the operation of the system of FIG. 1.

DETAILED DESCRIPTION OF THE INVENTION

Figure 1:
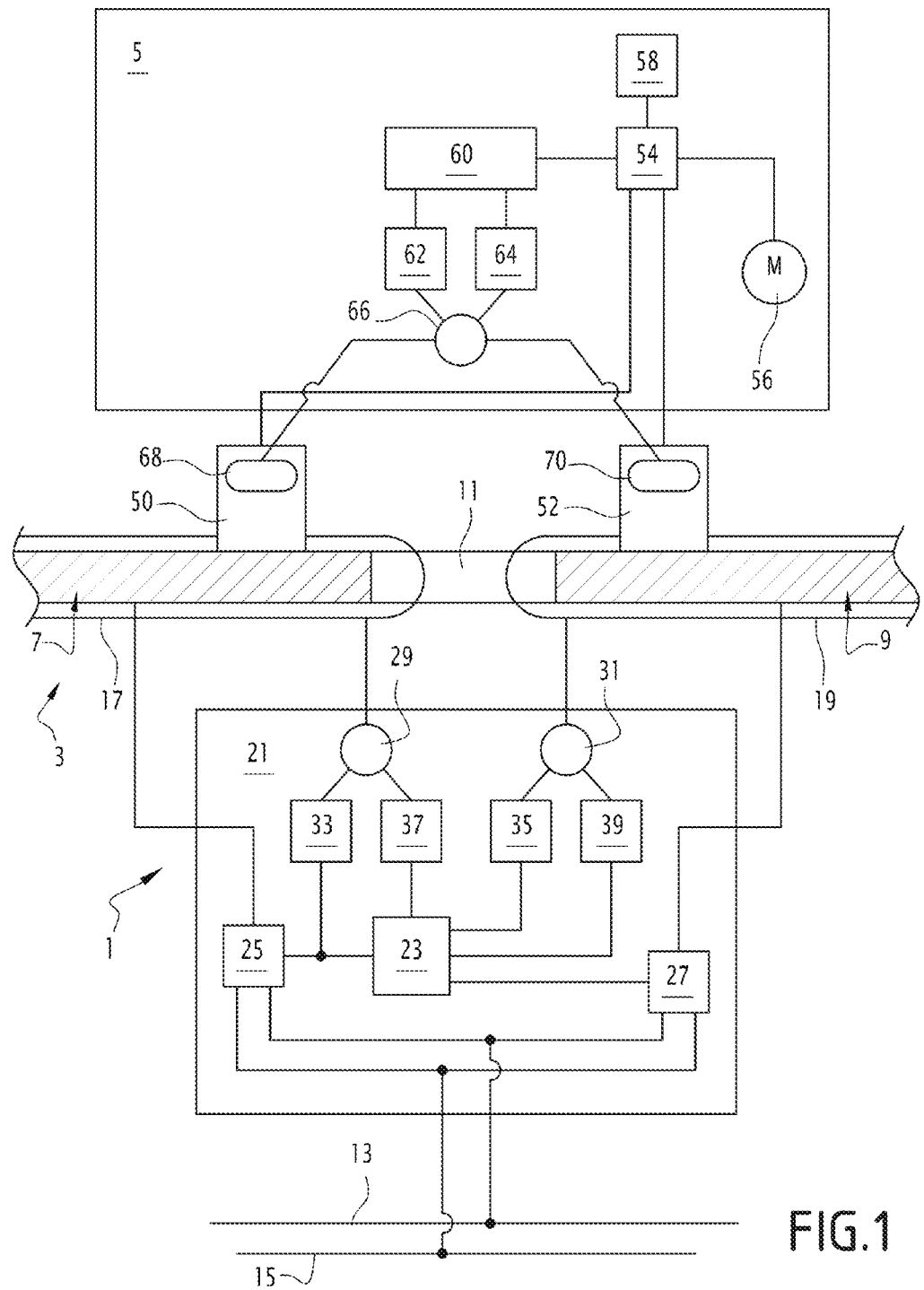
FIG. 1 is a block diagram of the land transport vehicle and ground equipment according to the invention.

FIG. 1 shows a simple block diagram of a railway vehicle according to the invention, in particular a tram, and ground equipment according to the invention. The following example is described relative to a railway vehicle. However, it should be noted that the invention is not limited to the railway vehicle and may also relate to other land transport vehicles supplied with electricity from the ground, for example a vehicle guided on rails or on tires.

The railway track is subdivided into zones with an external power supply and zones without an external power supply.

A zone with an external power supply includes ground equipment 1 including an external power supply device 3, which is arranged along the track. The external power supply device 3 is fixed to the ground. These zones for example correspond to straight lines.

A zone with no external power supply does not include such ground equipment. These zones for example correspond to curves, switches, intersections, deceleration zones or descents.

In the preferred embodiment, the external power supply device for the ground equipment 1 is of the ground power supply device type.

Such a device is formed by a series of oblong power supply segments, arranged parallel to the track, preferably between the two lines of rails forming said track. Two adjacent power supply segments are shown in FIG. 1. They bear references 7 and 9. The power supply segments are formed by bars of electrically conductive material.

Two adjacent power supply segments are separated by a short isolating segment 11 making it possible to isolate the two power supply segments from one another.

The segments 7, 9 and 11 are arranged so as to be flush with the surface of the road on which the power supply track is installed.

Along the series of power supply segments, the external power supply device 3 includes a power supply line 13, kept continuously at a power supply potential, as well as a ground line 15, which is at the potential of the running rail, close to the ground potential. The return of current consumed by the vehicle is for example provided by a running rail of the track.

The ground equipment 1 further includes several conductive loops forming antennas.

Each antenna surrounds a specific power supply segment with which it is associated. For example, in FIG. 1, the first power supply segment 7 is surrounded by a first antenna 17 and the second power supply segment 9 is surrounded by a second antenna 19.

In another embodiment, the antenna extends parallel to, but next to the power supply segment with which it is associated. In still another embodiment, an antenna is made up of a plurality of sub-antennas.

An antenna 17, 19 has, in the direction of the track, substantially the same length as the power supply segment with which it is associated. For example, it extends past the end of the power supply segment, up to the halfway point, in the direction of the track, of the isolating segment adjacent to that end.

Furthermore, the ground equipment 1 includes a control device 21, which is connected to the power supply line 13 and the ground line 15.

In the example shown in FIG. 1, the control device 21 is adapted to control two adjacent power supply segments, such as power supply segments 7 and 9.

In other embodiments, a control device is adapted to control either a single power supply segment, or more than two power supply segments.

The control device 21 is provided with a controller 23 adapted to steer a switch 25, 27, respectively, associated with the power supply segment 7, 9, respectively.

In another embodiment, the control device is provided with separate controllers dedicated to each power supply segment.

Each switch 25, 27 is arranged in series between the power supply line 13 or the ground line 15, on the one hand, and the corresponding power supply segment 7, 9, on the other hand. A switch 25, 27 makes it possible to selectively connect the corresponding power supply segment 7, 9 to the power supply line 13, to bring it to the power supply potential, or to the ground line, to bring it to the ground potential.

The controller 23 is adapted to power on a power supply segment 7, 9, respectively, only when a ground transport vehicle 5 is located over that power supply segment.

To that end, the control device 21 includes, for each antenna 17, 19, a coupler 29, 31, respectively.

Each coupler 29, 31 is connected to a receiver 33, 35 and a transmitter 37, 39.

The receivers 33, 35 and the transmitters 37, 39 are connected to the controller 23.

In one alternative embodiment, the receivers and transmitters are integrated into a single device.

The transmitters 37, 39 and the receivers are typically integrated into each control device 21, for example a power supply box installed in the ground.

In the currently preferred embodiment, the operating frequency of the receiver 33, 35 is different from the operating frequency of the corresponding transmitter 37, 39. For example, the receivers 33, 35 are adapted to receive a modulated radiofrequency signal over a carrier between 400 and 500 kHz, for example 483 kHz or 450 kHz, and the transmitters 37, 39 are adapted to transmit a modulated radiofrequency signal over a carrier between 30 and 50 kHz, for example 38 kHz.

The controller 23 is adapted to receive, via a receiver 33, 35, a presence signal sent by a vehicle 5, captured by the antenna 17, 19, indicating the presence of the vehicle 5 over the corresponding power supply segment 7, 9.

The controller 23 is adapted to send an uplink signal, in particular upon detecting the presence of the vehicle over a respective segment, via the transmitter 37, 39, respectively, and the antenna 17, 19, respectively, intended for the land transport vehicle 5 present over the power supply segment 7, 9, respectively. For example, in one embodiment, the uplink signal is transmitted in an uplink flow toward the land transport vehicle during the presence of the vehicle, in particular over a respective segment.

Furthermore, in response to the reception of a presence signal, the controller 23 is adapted to power on the corresponding power supply segment 7, 9, by modifying the state of the switch 25, 27, in order to connect the power supply line 13 to said corresponding power supply segment 7, 9.

When no presence signal is received, the controller 23 is adapted to connect the power supply segment 7, 9 to the ground line 15, or leave it connected thereto. To that end, the switch 25, 27 is placed in the conductive state between the power supply segment 7, 9 and the ground line 15.

In order to capture the electric current generated by the power supply device via the ground 3, the vehicle 5 includes at least one capture device, for example a collector shoe, that can be placed in contact with the segment above which the vehicle is located. The vehicle 5 of FIG. 1 includes two such capture devices, including a rear capture device 50 and a front capture device 52, which can be placed in contact with a power supply segment 7, 9. In one embodiment, the capture devices 50, 52 can be retracted or lifted.

Furthermore, the land transport vehicle 5 is provided with an onboard power supply device 58, for example a battery, a supercapacitor, a fuel cell or other types of onboard power supply devices.

Preferably, an onboard power supply device 58 that does not emit greenhouse gases is used.

The land transport vehicle is thus made autonomous, and can travel zones with no external power supply.

A switch 54 makes it possible to connect the capture devices and the onboard power supply device on the one hand, to one or each traction motor 56 of the vehicle 5 on the other hand.

An onboard controller 60 is connected to the switch 54 to simultaneously control the power supplied to the or each traction motor 56 coming from the capture devices 50, 52 and the power supplied to the or each traction motor 56 by the onboard power supply device 58.

Furthermore, the land transport vehicle 5 is provided with an onboard transmitter 62 and an onboard receiver 64. The onboard transmitter 62 and the onboard receiver 64 can be made in a single device. The onboard transmitter 62 and the onboard receiver 64 are connected via an onboard coupler 66 to onboard antennas 68, 70 respectively arranged in each capture device 50, 52.

An onboard antenna 68, 70 is arranged such that a radiofrequency signal is transmitted toward the ground antenna 17, 19, associated with the power supply segment 7, 9 with which the capture devices 50, 52 is in contact or above which the capture devices 50, 52 is located at the current moment.

The onboard antenna 68, 70 is adapted to receive radiofrequency signals coming from the ground antenna 17, 19, associated with the power supply segment 7, 9 with which the capture devices 50, 52 is in contact or above which the capture devices 50, 52 is located.

The onboard transmitter 62, the onboard receiver 64, the onboard coupler 66 and the onboard antennas 68, 70 together form a communication unit.

In one embodiment, the onboard transmitter 62 is adapted to send a signal having a carrier between 400 kHz and 500 kHz, for example 450 kHz or 483 kHz, to transmit a presence signal. The onboard receiver 64 is adapted to receive a signal having a carrier between 30 and 50 kHz, for example 38 kHz.

In a zone with an external power supply, at least one capture devices 48, 50 of the land transport vehicle 5 is in contact with a power supply segment, to capture power generated by the external power supply device, and apply it to the or each traction motor of the vehicle.

Conversely, in a zone with no external power supply, no capture device of the land transport vehicle 5 is in contact with a power supply segment 7, 9, since such segments do not exist in such a zone. The land transport vehicle 5 is forced to supply its traction motors with electricity from its own power reserves to travel over a zone with no external power supply. To be autonomous over such a zone of the track, the vehicle therefore includes an onboard power supply device. Thus, the zone with no external power supply corresponds to a zone to be traveled using the onboard power supply device.

Consequently, when the land transport vehicle 5 crosses the border between a zone with an external power supply and a zone with no external power supply, the land transport vehicle 5 is forced to switch the electric power source for its motors from the external power supply to the onboard power supply device.

To perform this switch effectively, the vehicle 5 is therefore be adapted to anticipate crossing the border between a zone with an external power supply and a zone with no external power supply.

To that end, the controller 23 of at least one power supply segment, which is situated at the end of the zone with an external power supply device close to the border between the zone with and the zone without an external power supply device, is adapted to integrate, in the uplink signal, a signal indicating the end of the zone with an external power supply. For example, the controllers 23 associated with the last two power supply segments 7, 9, situated at the end of a zone with an external power supply, are adapted to transmit a signal indicating the end of a zone with an external power supply.

In one embodiment, the two signals indicating the end of a zone with an external power supply associated with the last two segments of the zone with an external power supply have a different identifier, for example one or several different identification bits. For example, a first signal indicating the end of a zone with an external power supply is sent by the associated transmitter 39 to the last power supply segment 9 and a second signal indicating the end of a zone with an external power supply is sent by the associated transmitter 37 to the next-to-last power supply segment 7.

In another embodiment, only the uplink signal associated with the last power supply segment before the end of the zone with an external power source includes a signal indicating the end of a zone with an external power supply. In another embodiment, the uplink signal associated with the three or more of the last three power supply segments situated before the end of the zone with an external power supply include a signal indicating the end of a zone with an external power supply.

It should be noted that the term "last" is used considering the movement direction of the land transport vehicle on the track, from the zone with an external power supply toward the zone without an external power supply.

In the preferred embodiment, the uplink signal including the signal indicating the end of a zone with an external power supply is defined with an identifier that is preferably a four-bit binary number. This makes it possible to generate up to sixteen different identifiers, an identifier making it possible to include location information such as the proximity of the zone with no external power supply or the length of one of the segments and/or the length of the zone without an external power supply that the vehicle will enter. These identifiers will make it possible for the vehicle 5 to control the switching from one power source to the other in an appropriate manner. For example, the identifiers make it possible to define: location information relative to the end of the power supply zone, for example if it is the last or next-to-last segment before the end of the power supply zone; and information, for example binary, making it possible to identify the length of the zone with no power supply, for example allowing the vehicle to adapt the power supply load shedding of the auxiliaries.

Thus, a signal indicating the end of a zone with an external power supply is sent toward a land transport vehicle only at certain power supply segments. This gives the land transport vehicle location information, allowing it to anticipate the passage from a zone with to a zone without an external power supply.

When the onboard receiver 64 receives a signal indicating the end of a zone with an external power supply, the onboard controller 60 is adapted to locate the land transport vehicle 5 relative to the border and order the switch 54 to go from the external power supply device to the onboard power supply device 58 of the land transport vehicle 5.

The onboard controller 60 is adapted to compute a position of the land transport vehicle 5 on the track from the location information received by the onboard receiver 64. For example, the length of the power supply signals 7, 9 being known, receiving a first signal, then a second signal makes it possible, knowing the current speed of the vehicle, to determine the moment at which the border will be crossed.

From this location information, when the land transport vehicle 5 approaches the end of the zone with an external power supply on which it is found, the onboard controller 60 is adapted, during a transitional phase, to reduce the request for electricity from the capture devices 50, 52 in a controlled and gradual manner.

For example, the onboard controller 60 is adapted to reduce the power demand from the ground equipment 1 via the capture devices 50, 52, when that power exceeds the maximum power that the onboard power supply device 58 can supply. The reduction in the power supplied to the traction motors leads to a reduction in the traction force of the vehicle.

Then, once the power from the ground equipment 1 is below the maximum power that the onboard power supply device 58 can supply, it is possible to switch the power source of the traction motors to that second power source without modifying the traction force of the vehicle, and therefore without any abrupt variation in the acceleration.

Thus, the onboard controller 60 is adapted, in the transitional phase, to increase the power demand from the onboard power supply device 58 to power the traction motor 56 while reducing the power demand from the external power supply device accordingly.

Furthermore, the onboard controller is adapted to reduce the power demand coming from the external power supply device, such that it is substantially equal to zero, when the rear capture device 50 leaves the last external power supply segment 9.

Thus, by appropriate switching between the external and onboard electricity supplies of the land transport vehicle 5 during its use, the traction of the land transport vehicle 5 is regulated to avoid any abrupt variation in the acceleration. The low variation of the acceleration over time, also called "jerk", preserves passenger comfort.

Advantageously, the formation of an electric arc between the vehicle 5 and the ground equipment 1 is avoided.

Furthermore, in one embodiment, the onboard controller 60 is adapted to lift the capture device(s) in the zone with no external power supply.

Also, the information on the length of the zone with no external power supply and a location, by the onboard controller 60, based on the speed or a distance traveled by the vehicle, next makes it possible to again lower the capture device(s) when the land transport vehicle 5 reaches the following zone with an external power supply, after having crossed the zone with no external power supply.

Hereinafter, the operation of the invention will be outlined using FIGS. 2 to 8.

The land transport vehicle corresponds to the land transport vehicle 5 of FIG. 1. Therefore, the reference signs used for the land transport vehicle 5 have been used again in FIGS. 2 to 8.

FIGS. 2 to 8 show a piece of ground equipment 1 including three successive external power supply segments 100, 102, 104 in the direction of the track. The power supply segments are separated by an isolating segment 106, between the first segment with a power supply 100 and the second power supply segment 102, and a second isolating segment 108 between the second power supply segment 102 and the third power supply segment 104. The successive power supply segments thus form an external power supply zone 110 of the land transport vehicle 5.

In the movement direction of the land transport vehicle, the isolating segments have a length smaller than the distance between the rear capture device 50 and the front capture device 52. In this way, a continuous external power supply is provided in the zone with an external power supply 110.

The vehicle 5 is in motion in the direction of arrow 112 toward a zone with no external power supply 114.

The border 116 is between the two zones 110, 114, in vicinity to the end of the third power supply segment 104.

The first power supply segment 100 and the second power supply segment 102 are connected to a first control device 116. The third power supply segment is connected to a second control device 118. The two control devices 116, 118 are respectively connected to the power supply line 13 and the ground line 15. A first antenna 120 is associated with the first power supply segment 100, a second antenna 122 is associated with said power supply segment 102, and a third antenna 124 is associated with the third power supply segment. The antennas 120, 122, 124 are, like the power supply segments 100, 102, 104, integrated into the ground around the respective power supply segment 100, 102, 104. The first antenna 120 and the second antenna 122 are connected to the first control device 116 and the third antenna 124 is connected to the second control device 118. The second antenna 122 is adapted to send a first signal indicating the end of a zone with an external power supply and the third antenna 124 is adapted to send a second signal indicating the end of a zone with an external power supply. The first signal is different from the second signal. In one embodiment, the second antenna 122 and/or the third antenna 124 continuously send the signal indicating the end of a zone with an external power supply.

Figure 2:
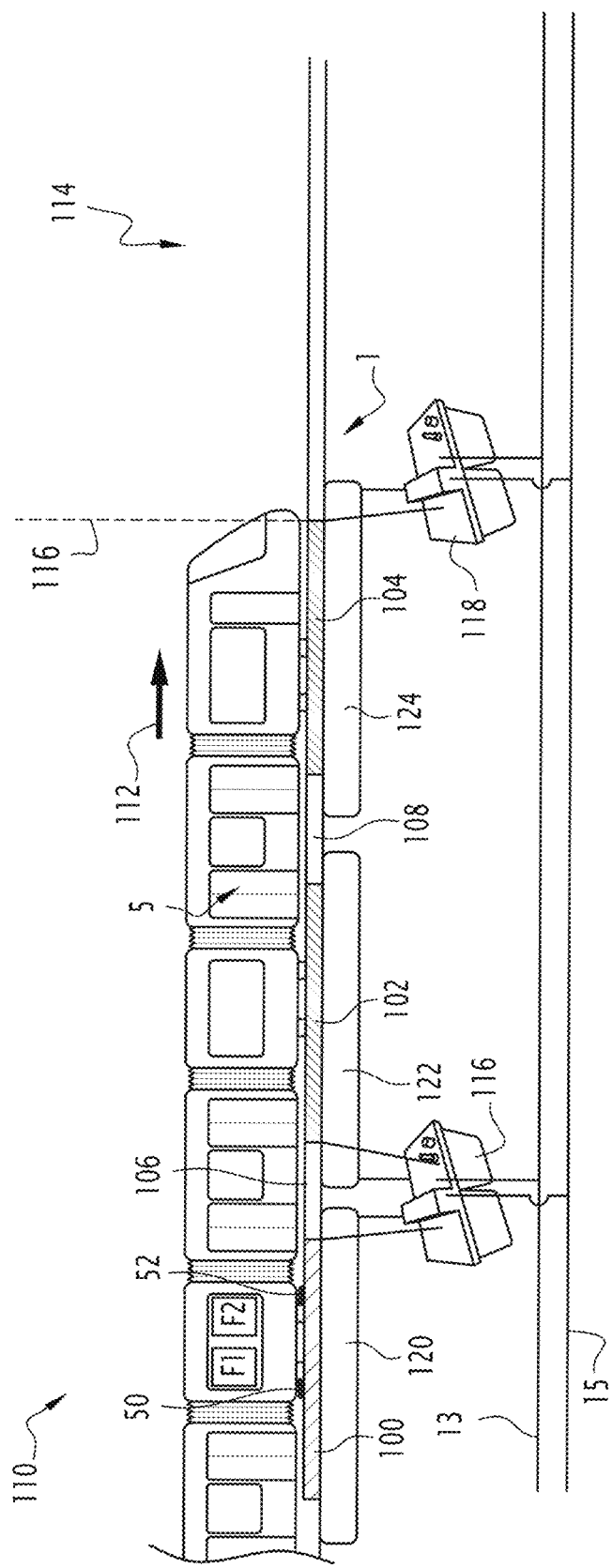

In FIG. 2, the land transport vehicle 5 sends a presence signal, from onboard antennas 68, 70 to the first ground antenna 120 associated with the first power supply segment 100, with which the two capture devices 50, 52 are in contact. Consequently, the control device 116 sends the uplink signal via the antenna 120 and powers on the first power supply segment 100 by connecting it to the power supply line 13. Conversely, the second power supply segment 102 and the third power supply segment 104 are connected to the ground line 15.

In FIG. 3, the land transport vehicle 5 is moved in the movement direction 112. Now, only the rear capture device 50 is in contact with the first power supply segment 100. The antenna 70 of the front capture device 52 then receives the first signal indicating the end of a zone with an external power supply, sent by the second antenna 122.

The transitional phase begins in order to switch the power supply of the traction motors from the external power supply device to the onboard power supply device.

The onboard controller 60 compares the current speed with a predetermined speed. If the current speed is greater than a predetermined speed, the onboard controller 60 commands the onboard power supply device 58 to gradually reduce the power supply to the traction motor 56. If the speed is below the predetermined speed, the onboard controller 60 waits for the following code to reduce the traction force applied to the traction motor 56.

In FIG. 4, the two capture devices 50, 52 have left the first power supply segment 100 and the front capture device 52 is in contact with the second power supply segment 102. Consequently, the control device 116 no longer receives a presence signal via the antenna 120, and the first power supply segment 100 is disconnected from the power supply line 13 and is connected to the ground line 15. The second power supply segment 102 is connected to the power supply line 13. At that stage, the two onboard antennas 68, 70 receive the first signal indicating the end of a zone with an external power supply. The onboard controller 60 detects the current speed. If speed is above a predetermined speed, a reduction in the speed supplied to the traction motor is once again commanded.

In FIG. 5, the antenna 70 ranged in the capture device 52 receives the second signal indicating the end of a zone with an external power supply sent by the third antenna 124 that is associated with the third power supply segment 104. The onboard controller 60 deduces the distance D between the rear capture device 50 and the border 116 therefrom. If the speed is still above the predetermined speed, the onboard controller initiates the switching of the power supply sources.

In FIG. 6, the land transport vehicle 5 is positioned such that the antennas of the two capture devices 50, 52 receive the signal sent by the third antenna 124, associated with the third power supply segment 104. The onboard controller receives, via the two onboard antennas 68, the second signal indicating the end of a zone with an external power supply. The onboard controller deduces the distance D between the rear capture device 50 and the border 116 therefrom. The onboard controller 60 commands a complete transition toward the onboard power supply device 58. To that end, it commands the increase in the power delivered by the onboard power supply device 58 to the traction motor 56, until complete switching to the onboard power supply device 58, the power from the external device then being null. Furthermore, the first control device 116 connects the second power supply segment to the ground line 15, and the second control device connects the third power supply segment 104 to the power supply line 13.

In the FIG. 7, the front capture device 52 has already passed the border 116 and there is no longer any signal indicating the end of a zone with a power supply received by the onboard antenna 70. Therefore, the second signal indicating the end of a zone with an external power supply is only received by the antennas 68 integrated into the rear capture device 50. The onboard controller 60 deduces the distance D between the rear capture device 50 and the border 116 therefrom. If the onboard controller 60 has not yet commanded switching of the external power supply device toward the onboard power supply device 58, the onboard controller 60 commands the onboard power supply device 58 to do so.

In FIG. 8, the rear capture device 50 loses contact with the third power supply segment 104. Nevertheless, the antenna 68 still receives the second signal indicating the end of a zone with an external power supply. The onboard controller 60 can now control the raising of the capture devices 50, 52. The land transport vehicle 5 now moves by using the onboard power supply device 58 to power the traction motor 56. The transitional phase is then complete.

During the transitional phase, the power requested by the traction motor 56 is adjusted to the maximum power that the onboard power supply device can deliver. Then, switching between the two power supply devices is done.

Advantageously, the power demand provided by the external power supply device is substantially reduced to zero when the rear capture device does not leave the last power supply segment of the external power supply zone.

Thus, the invention makes it possible to anticipate autonomous zones and makes it possible optimally to steer an onboard power supply device, for example a supercapacitor box, onboard the land transport vehicle, while ensuring passenger comfort during the transitional phases between power sources.

Furthermore, the formation of an electric arc between the land transport vehicle and the end of the segment in vicinity to the end of the external power supply zone is avoided, such an arc being adapted to deteriorate the infrastructure on the ground. Indeed, the invention makes it possible to prevent, at the moment when the rear capture device leaves the last segment, the power circuit from being open while it is still fully charged, which would cause an arc to form. Anticipating the end of the external power supply zone makes it possible to cancel the current request by the capture devices before the end of the external power supply zone.

Typically, the signal for the end of an external power supply zone is emitted only at the end power supply segments or end of the external power supply zone.

Similarly, the first segments of a zone with an external power supply indicate to the vehicle that it has just crossed the border between a zone with no external power supply and a zone with an external power supply. When it receives such an uplink signal, the vehicle commands a transitional phase making it possible to switch continuously from a power demand from the onboard power supply device to a power demand from the external power supply device in order to power the traction motors of the vehicle.

The invention claimed is:

1. A method for controlling a land transport vehicle traveling on a track, the track including, in a movement direction of the land transport vehicle, a zone with an external power supply adjacent to a zone without an external power supply to be traveled with an onboard power supply device, the zone with an external power supply including an external power supply device on the ground provided with a plurality of power supply segments arranged sequentially in the direction of the track, the land transport vehicle including at least one capture device adapted to be placed in contact with a power supply segment on the one hand and to be electrically connected to at least one traction motor on the other hand, the land transport vehicle further including an onboard power supply device adapted to be electrically connected to the or each traction motor, the method including at least the following steps:
   a) powering the or each traction motor with a power supplied by a power supply segment, with which the capture device is in contact;
   b) emitting, via an antenna associated with the power supply segment situated close to the end of the zone with an external power supply, a signal indicating the end of the zone with an external power supply;
   c) receiving, by the land transport vehicle positioned in vicinity of the power supply segment associated with the antenna sending said signal indicating the end of a zone with an external power supply, the signal indicating the end of a zone with an external power supply;
   d) commanding, after receiving the signal indicating the end of a zone with an external power supply, a transition from a power demand from the external power supply device to a power demand from the onboard power supply device to power the or each traction motor.

2. The method according to claim 1, including, before step b), the following steps:
   sending, by the land transport vehicle, a presence signal of the land transport vehicle to the antenna associated with the power supply segment, the signal indicating the end of a zone with an external power supply being sent by the same antenna in response to the presence signal of the land transport vehicle.

3. The method according to claim 2, wherein, in response to the presence signal of the land transport vehicle, the power supply segment with which the antenna is associated is powered on.

4. The method according to claim 1, wherein the transition command includes a comparison of the current speed with a predetermined speed; a decrease in the power requested from the external power supply device; an increase in the power requested from the onboard power supply device; an adjustment of the power requested from the external power supply device to a maximum power generated by the onboard power supply device; and/or a switch to the onboard power supply device.

* * * * *